(12) United States Patent
Carson

(10) Patent No.: US 6,477,124 B2
(45) Date of Patent: Nov. 5, 2002

(54) VARYING THE RATE AT WHICH DATA APPEAR ON AN OPTICAL DISC ROTATED AT A CONSTANT LINEAR VELOCITY TO PREVENT UNAUTHORIZED DUPLICATION OF THE DISC

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 11 days.

(21) Appl. No.: 09/860,791

(22) Filed: May 18, 2001

(65) Prior Publication Data

US 2002/0126606 A1 Sep. 12, 2002

Related U.S. Application Data

(60) Provisional application No. 60/249,030, filed on Nov. 15, 2000.

(51) Int. Cl.$^7$ .................................................. G11B 7/00
(52) U.S. Cl. ............................ 369/53.21; 369/275.3; 369/47.45
(58) Field of Search ...................... 369/53.21, 275.3, 369/47.12, 47.29, 47.38, 47.45, 47.43, 30.05, 30.19, 84

(56) References Cited

U.S. PATENT DOCUMENTS

| | | | |
|---|---|---|---|
| 4,228,326 A | 10/1980 | Dakin et al. | |
| 4,800,548 A | 1/1989 | Koishi et al. | |
| 5,070,492 A | 12/1991 | Ogawa et al. | |
| 5,272,687 A | 12/1993 | Matsushima | |
| 5,343,455 A | 8/1994 | Takeuchi et al. | |
| 5,463,604 A | 10/1995 | Naito | |
| 5,513,160 A | 4/1996 | Satoh et al. | |
| 5,526,339 A | 6/1996 | Shimada | |
| 5,559,777 A | 9/1996 | Maeda et al. | |
| 5,642,342 A | 6/1997 | Murata | |
| 5,687,158 A | 11/1997 | Kawasaki et al. | |
| 5,787,068 A | 7/1998 | Arps et al. | |
| 5,809,006 A * | 9/1998 | Davis et al. | 369/53.21 |
| 5,812,512 A * | 9/1998 | Tobita et al. | 369/30.19 |
| 5,825,733 A | 10/1998 | Ogawa | |
| 5,831,964 A | 11/1998 | Tanaka | |
| 5,933,399 A | 8/1999 | Kim | |
| 6,097,814 A | 8/2000 | Mochizuki | |
| 6,236,804 B1 * | 5/2001 | Tozaki et al. | 386/95 |
| 6,320,825 B1 * | 11/2001 | Bruekers et al. | 369/30.17 |

* cited by examiner

*Primary Examiner*—Thang V. Tran
(74) *Attorney, Agent, or Firm*—Fellers, Snider, et al.

(57) ABSTRACT

Apparatus and method for recording data to an optical disc to prevent unauthorized duplication of the disc. The disc includes a data placement zone to which first data are written at a first data rate as the disc is rotated at a selected linear velocity. The disc further includes a velocity disruption zone to which second data are written at a second different data rate as the disc is rotated at the selected linear velocity. The variation in frequency between the first and second data rates preferably causes a readback system to lose frequency lock on the second data during a continuous access operation on the first and second data. An unauthorized disc can also be detected by comparing the disc linear velocity as the second data are accessed to a target linear velocity. Access to the disc can be denied when a velocity mismatch is detected.

19 Claims, 7 Drawing Sheets

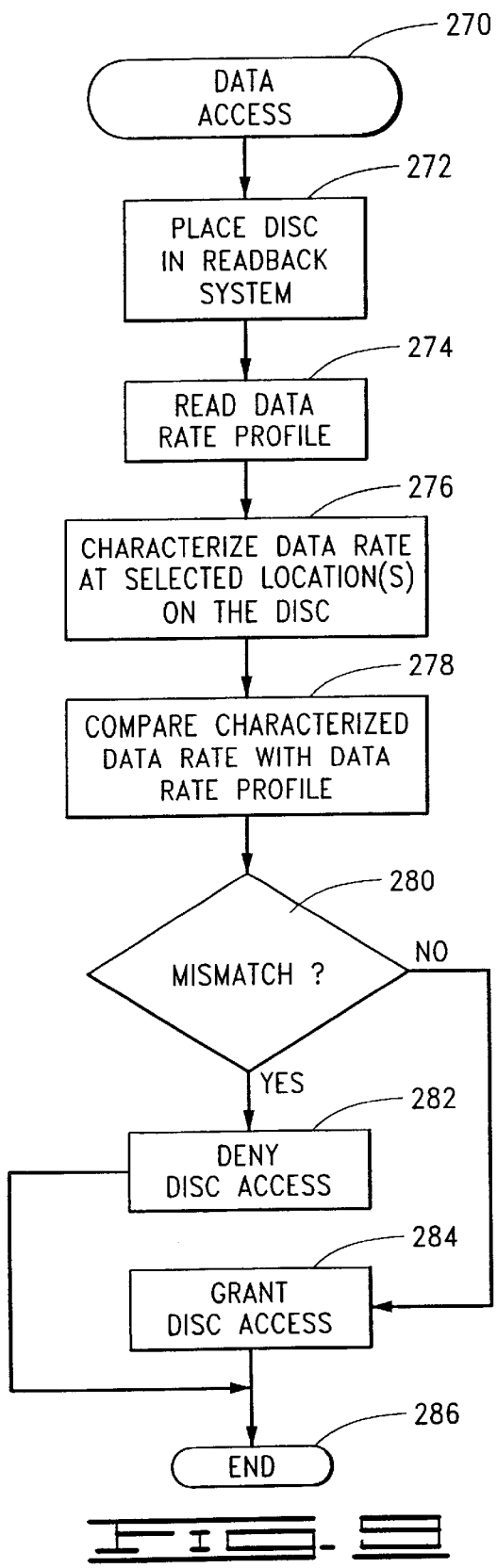

VARYING THE RATE AT WHICH DATA APPEAR ON AN OPTICAL DISC ROTATED AT A CONSTANT LINEAR VELOCITY TO PREVENT UNAUTHORIZED DUPLICATION OF THE DISC

RELATED APPLICATIONS

This application claims priority to United States Provisional Application No. 60/249,030 filed Nov. 15, 2000.

FIELD OF THE INVENTION

The present invention relates generally to the field of optical disc technology and more particularly, but without limitation, to the prevention of unauthorized duplication of an optical disc by providing changes in rates at which data pass a readback head assembly while the disc is rotated at a constant linear velocity.

BACKGROUND

Optical discs have become increasingly popular as efficient and cost-effective portable storage media for digitally stored data. A typical optical disc comprises a circular disc having a recording layer of light reflective material embedded in a refractive substrate. The recording layer is disposed along a plane substantially normal to an axis about which the disc is rotated and stores data as a sequence of optically detectable patterns, such as pits and lands (also sometimes referred to as "marks" and "spaces") along a continuously extending spiral track. The length of each pit and land corresponds to one of a selected number of data symbols (for example, from 3T to 11T, with T of determined length).

The data symbols are recovered from the disc through the use of a readback head assembly which includes a light source and an optical transducer. The light source applies light of selected wavelength to the rotating disc and the transducer generates a readback signal indicative of the data in relation to the relative differences in reflectivity of the patterns. Motor velocity control circuitry is used to rotate the disc at an appropriate linear velocity so that the rate (frequency) at which the patterns reach the readback head assembly is within the frequency lock capabilities of data recovery circuitry used to detect and decode the readback signal.

Optical discs typically store audio, video, computer programs and other related types of data. Present generation optical disc formats include compact disc (CD) and digital versatile disc (DVD), although other disc formats and configurations have been proposed and commercialized. While individual recordable discs are available to record data from a user device (such as a host computer), the vast majority of optical discs have historically been produced in a mastering process in which a master disc is generated. The master disc is used to form a series of stampers which are then used to create a population of injection molded replicated discs all having nominally the same characteristics. The large data capacity, low cost, convenience and portability of optical discs have contributed to the commercial success of such discs.

Due to the worldwide consumer demand for the types of data available on optical discs, combined with the relative ease with which unauthorized copies of optical discs can often be generated, suppliers of optical discs have attempted to implement various disc authentication schemes to authenticate the discs; that is, to determine whether a particular disc is an authorized copy. Such disc authentication can occur in the form of copy protection or forensic tracking efforts.

Generally, copy protection involves configuring the optical disc in such a manner that an authorized disc functions properly in a readback system, but an unauthorized copy does not. One common copy protection scheme used in computer data discs (e.g., CD-ROM) is to write certain copy protection data at certain locations on a disc. When the disc is subsequently loaded into a host computer, a system processor polls these locations and verifies the contents before granting access to remaining portions of the disc.

Forensic tracking efforts generally entail storing certain "marking" or "tracking" information on the disc. The forensic information usually does not prevent an unauthorized copy from functioning in the readback system, but based on the presence or absence of the information, a determination can be made whether a particular optical disc is in fact an authorized copy. Forensic information may include, for example, information relating to the ownership of the contents of the disc, when and where the mastering process occurred, etc.

Although prior art disc authentication schemes have met with various levels of success, there remains a continued need for improved ways to prevent unauthorized duplication of optical discs, and it is to such improvements that the present invention is directed.

SUMMARY OF THE INVENTION

The present invention is directed to an apparatus and method for recording data to an optical disc to prevent unauthorized duplication of the disc.

In accordance with preferred embodiments, the data are written to the disc along a continuous spiral in the form of optically detectable patterns for subsequent access by a disc readback system. The readback system includes a motor configured to rotate the disc at a nominally constant linear velocity, a readback head assembly configured to transduce the patterns, and readback recovery circuitry configured to obtain frequency lock on the patterns as the patterns are rotated past the head assembly.

The disc is provided with a data placement zone to which first data are written to produce a first data rate as a frequency at which the first data pass the readback head assembly as the disc is rotated at a selected linear velocity. The disc further includes a velocity disruption zone adjacent the data placement zone to which second data are written to produce a second data rate as a frequency at which the second data pass the readback head assembly as the disc is rotated at the selected linear velocity.

Preferably, the variation in frequency between the first and second data rates is selected to cause a readback system to lose frequency lock on the second data during a continuous access operation on the first and second data. Thus, the first and second data can be accessed during separate access operations, but not during the same operation. This prevents a third party from creating an unauthorized duplicate of the disc through a continuous reading operation wherein the disc is read from lead-in to lead-out to generate a modulation signal which is then used to directly cut the duplicate disc.

In another embodiment, the disc is provided with a data profile zone to which information is stored relating to the first and second data rates, including a target disc linear velocity at which the disc is rotated to enable the readback system obtain frequency lock on and recover the second data. An unauthorized duplicate disc formed from the foregoing continuous read process will provide the second data at a different, nominal data rate as compared to the rate for an authorized disc.

Thus, during a disc access operation the disc linear velocity is measured as the readback system reads the second data. The measured disc linear velocity is compared to the target disc linear velocity, and further access to the disc is denied when a velocity mismatch is detected. In this way, even if a third party is able to create a bit-for-bit unauthorized duplicate of the original, the unauthorized duplicate will not exhibit the same velocity variations as the original and will not be playable in the readback system.

Other features and advantages which characterize the present invention will be understood by a review of the following detailed description section in conjunction with a review of the associated drawings.

BRIEF DESCRIPTION OF THE DRAWINGS

FIG. 9 is a flow chart for a DATA ACCESS routine, illustrative of steps carried out in accordance with preferred embodiments of the present invention to subsequently access the data written to the optical disc by the routine of FIG. 8.

DETAILED DESCRIPTION

Figure 1:
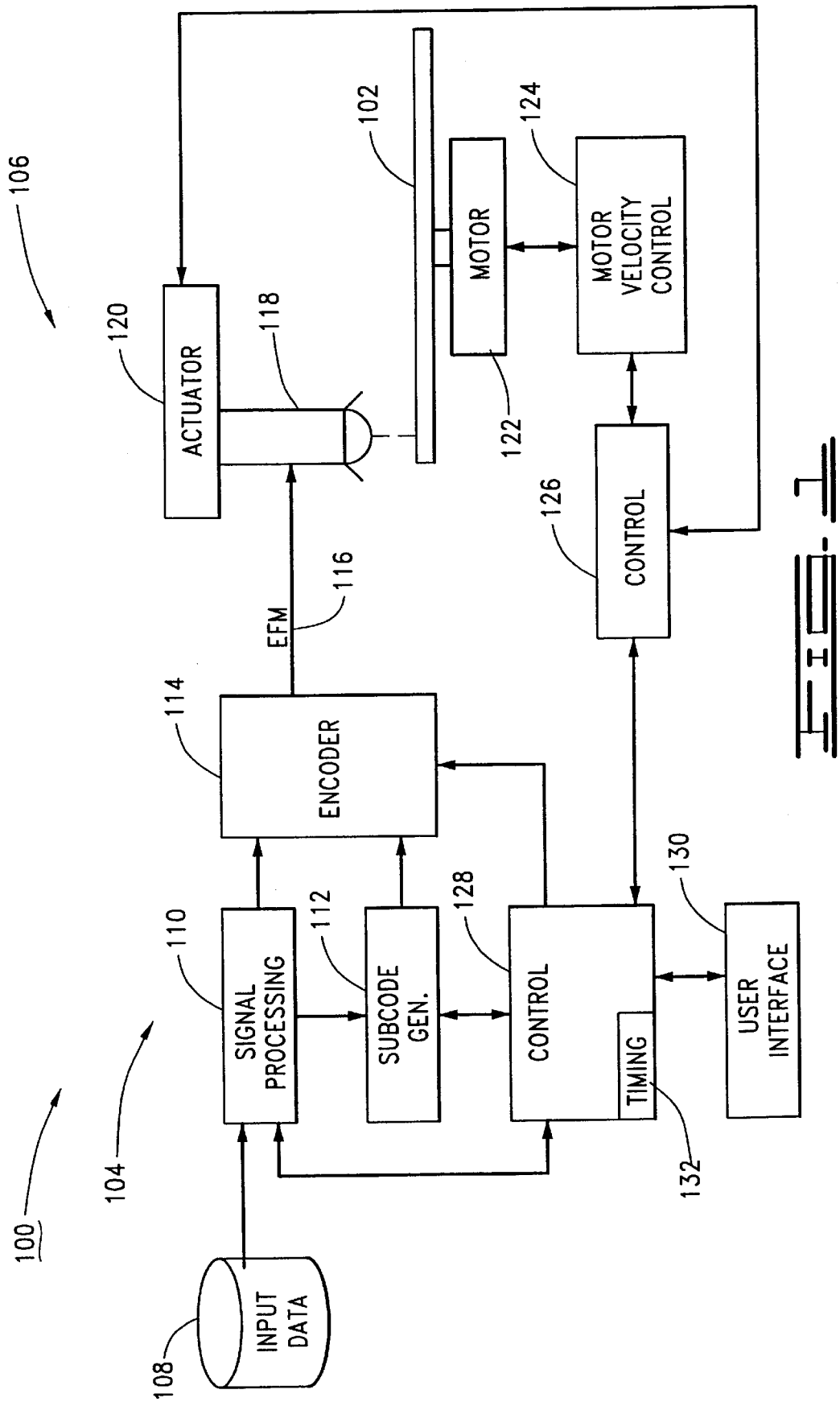
FIG. 1 is a functional block diagram of an optical disc recording system constructed in accordance with preferred embodiments of the present invention.

Referring now to FIG. 1, shown therein is a functional block diagram of an optical disc recording system 100 constructed in accordance with preferred embodiments of the present invention. The system 100 is used to record data to an optical disc 102.

For purposes of the present discussion, the system 100 is contemplated as comprising a mastering system which generates a master disc 102 from which a population of nominally identical replicated discs are subsequently formed. However, it will be understood that the present invention can readily be embodied in a system used to directly generate individually recorded discs. The optical disc 102 will be contemplated as comprising a compact disc read-only memory (CD-ROM) master disc, although other disc formats can readily be used.

The system 100 comprises two main subsystems: a front-end signal processing system 104 (also referred to as an "authoring" system) and a laser beam recorder (LBR) 106. The authoring system 104 is preferably embodied in hardware and software in a personal computer (PC). The LBR 106 is a conventional unit readily available from a variety of commercial sources.

Input data 108 to be recorded to the disc 102 are provided to a signal processing block 110 of the authoring system 104 to generate a conventional main channel data stream. A subcode generator block 112 generates subcode to provide timing and control data associated with the main channel data. As will be recognized, during subsequent readback from the master disc 102 (or a replica thereof), output data substantially corresponding to the input data 108 will be from the main channel, and the subcode will enable the readback system to access and output the data from the main channel.

The main channel and subcode data are provided to an encoder block 114 which modulates the data to provide an extended frequency modulation (EFM) signal on path 116. The EFM signal is a high frequency two-state signal with pulse durations that correspond to the range of data symbols to be written to the disc 102 (in this case 3T-11T in length, with T of determined length). The EFM signal is provided to a writing assembly 118 which includes a laser and the necessary control optics to focus a writing beam upon the disc; the EFM signal thus serves to modulate (turn on and off) the light beam to write pit and land areas corresponding to the data symbols within the EFM signal.

An actuator assembly 120 advances the writing assembly 118 across the radius of the disc 102 in a controlled fashion. A motor 122 rotates the disc 102 in response to control signals provided by a motor velocity control block 124. A top-level control block 126, preferably comprising a programmable processor and associated memory, provides top level control of the LBR 106.

The LBR control block 126 communicates with a corresponding top-level control block 128 of the authoring system 104, with the control block 128 also preferably comprising a programmable processor with associated memory. The control block 128 provides top level control of the authoring system 104 and processes user inputs from a user interface 130. The control block 128 also provides system timing from a timing block 132 to control the rate at which data are written to the disc 102.

As will be recognized, data are typically written to a conventional optical disc so that the data may be subsequently recovered while the disc is rotated at a constant linear velocity (CLV). A fixed frequency T is selected for the EFM signal and the rotational velocity of the disc is successively decreased as the writing assembly is moved from the inner diameter (ID) to the outer diameter (OD). In this way, all of the pits and lands of a given symbol length (e.g., 3T, 4T, etc.) have nominally the same physical size regardless of location on the disc. The data are subsequently retrieved at a substantially constant readback data rate (frequency) and the linear velocity of the disc is adjusted to maintain this data rate within a selected range.

While CLV recording provides an efficient methodology for recording data to a disc, such approach also makes it relatively easy to create unauthorized duplicate copies of the disc ("pirated copies"). As will be recognized, it is common to record the data on an optical disc in one long, continuous spiral, with each turn of the spiral about the disc providing a different track. The spiral will typically continuously extend from a lead-in zone at the ID to a lead-out zone at the OD.

By playing the disc sequentially from lead-in to lead-out, an EFM signal can be generated from the pit and land sequence on the spiral and fed directly into the LBR 106, bypassing the authoring system 104 completely. This results in an unauthorized duplicate disc that is nominally identical to the original. Any disc authentication data placed on the original disc, such as intentional errors placed at selected locations to provide copy protection for the disc, are copied bit-for-bit and are present on the unauthorized duplicate disc as well. This will readily defeat even complex, multi-layered copy protection schemes since all the data necessary to "authenticate" the disc is present on the pirated copy.

It will be noted that with certain types of discs, such as computer RAM and ROM discs, the data are typically accessed in a noncontiguous fashion. That is, instead of continuously reading the disc from lead-in to lead-out, a readback head assembly is directed to move to different locations across the disc to output data from different data fields (frames) as required by the host device.

Figure 2:
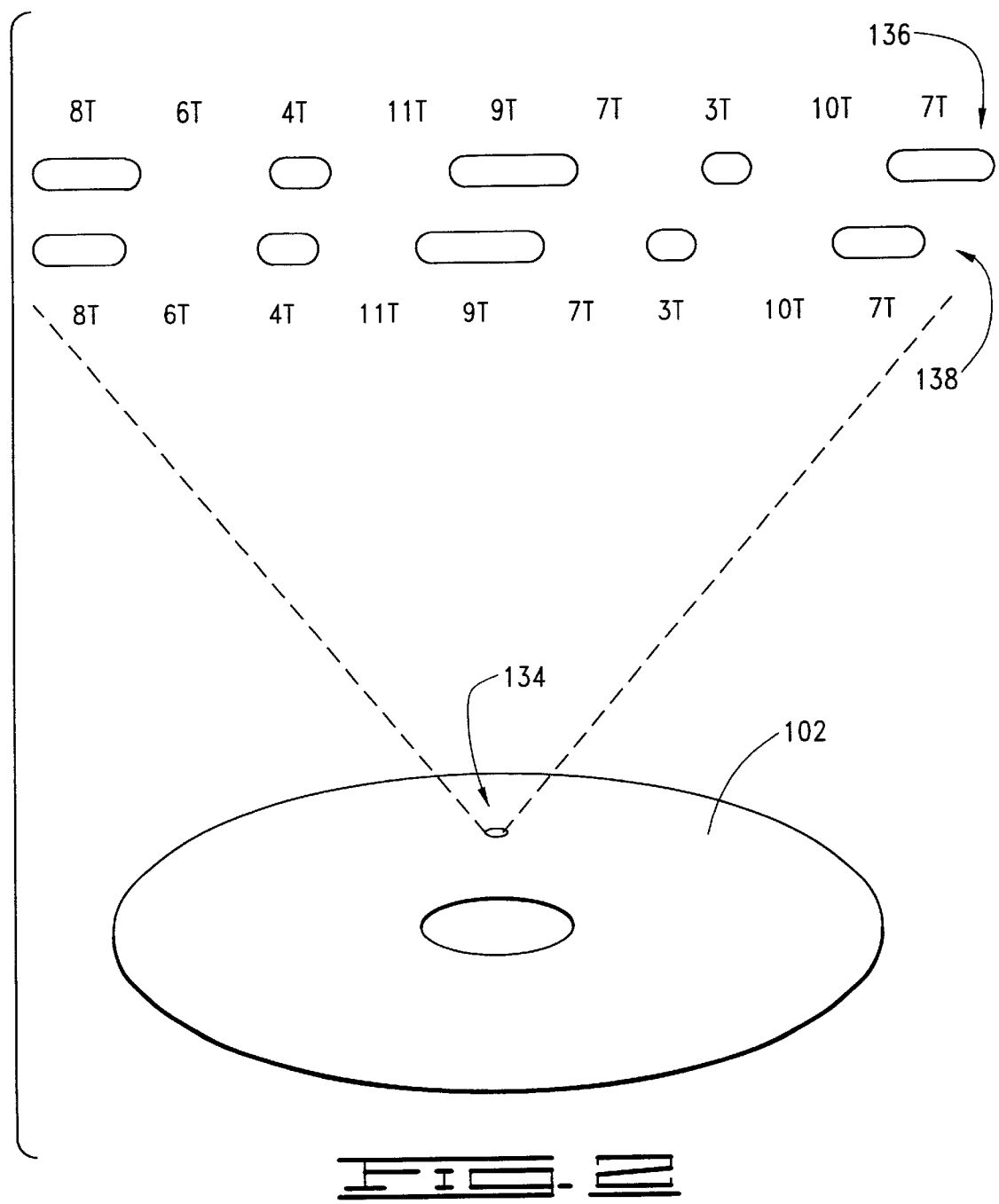
FIG. 2 is a schematic representation of the optical disc of FIG. 1, showing the manner in which a localized change in the rate at which data are written to the disc advantageously prevents continuous readback of the data on the disc from lead-in to lead-out.

Thus, the system 100 advantageously operates to selectively change the rate at which data appear on at least certain locations on the disc 102. FIG. 2 illustrates the manner in which this is preferably accomplished. As shown in FIG. 2, a small portion 134 of the disc 102 has been magnified to illustrate portions of a pair of adjacent tracks 136, 138 to which data have been recorded as a series of pits and lands (the pits are denoted as ovals which extend into the disc at a selected depth). For simplicity of illustration, the same data symbol pattern is shown for each of the tracks 136, 138 (i.e., the sequence 8T, 6T, 4T, 1T, 9T, 7T, 3T, 10T, and 7T), although typically each track will store a different set of patterns.

In this example, it is contemplated that the data symbols of track 136 are written by the system 100 of FIG. 1 at a nominal data rate, so that the pit and land lengths shown therein are representative of the nominal lengths for remaining portions of the disc. However, the data symbols of track 138 are written by the system 100 at a different rate (in this case, a higher rate), so each symbol of track 138 is substantially shorter in length as compared to the nominal lengths of the symbols of track 136. Such increase in data rate can be readily accomplished by using the timing block 132 (FIG. 1) to increase the timing frequency T, or by instructing the motor 122 to increase the rotational velocity of the disc 102 (or both). Depending upon the change in data rate and the relative difference in timing of the respective tracks, a readback system, having successfully obtained frequency lock on the data of track 136, may be unable to make the transition and successfully lock onto the higher frequency of the data of track 138.

Figure 3:
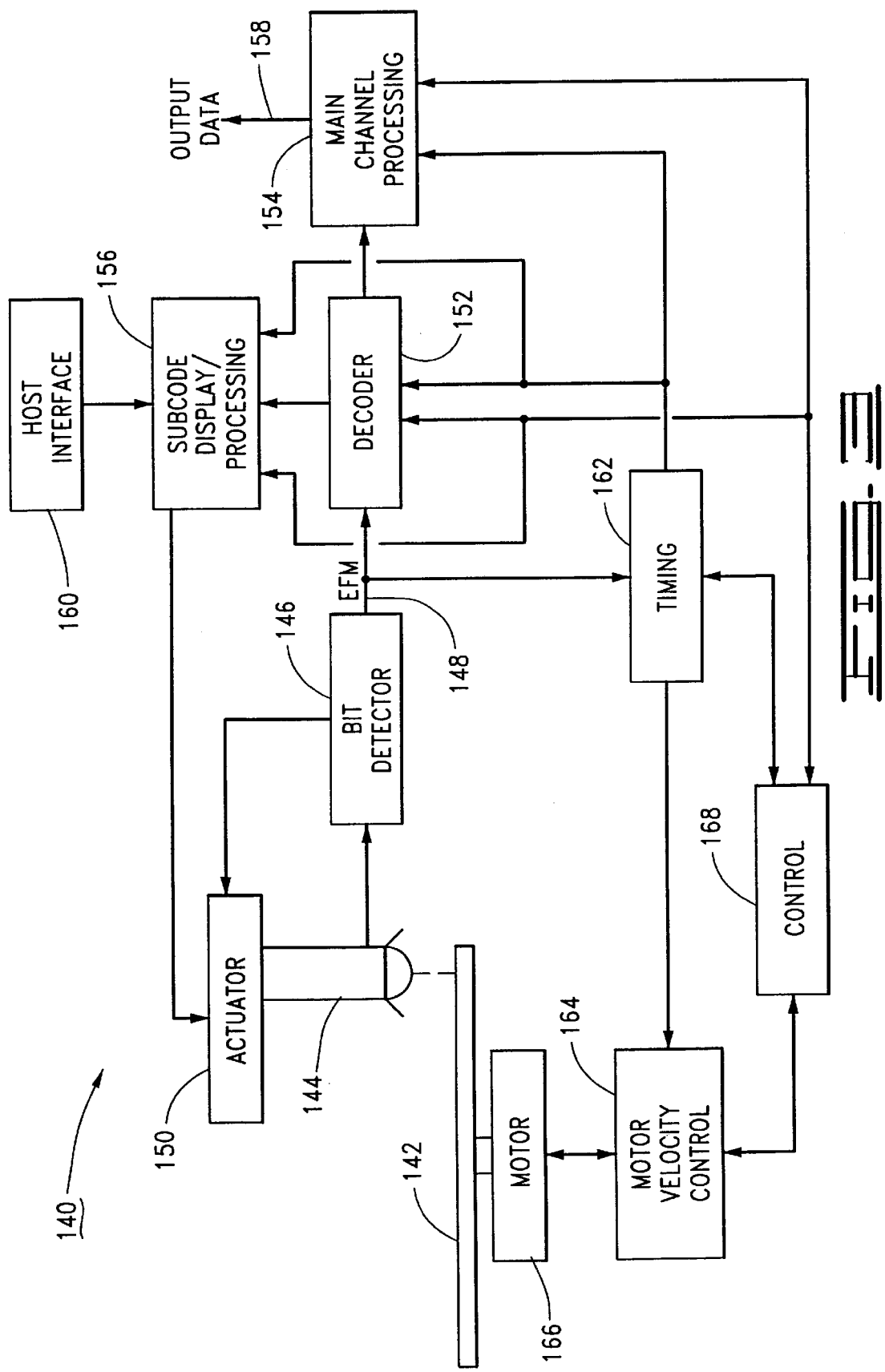
FIG. 3 is a functional block diagram of an optical disc reading system configured in accordance with preferred embodiments to read data previously recorded to an optical disc using the system of FIG. 1.

To better illustrate how disruptions such as presented by the track 138 will tend to affect continuous playback, FIG. 3 provides a functional block diagram of relevant portions of a readback system 140 configured to read an optical disc 142. The optical disc 142 is contemplated as comprising a replicated CD-ROM disc formed from the master disc 102 created by the system 100 of FIG. 1. It will be understood, however that the readback system 140 can readily be incorporated in a system configured to individually record optical discs.

A readback head assembly 144 includes a laser and a transducer (not separately shown) configured to focus a light beam upon a track of the disc 142 to detect the transitions between the pits and lands and output an analog detection signal (sometimes referred to as an "eye pattern") in response thereto. The detection signal is provided to a bit detector block 146 which conditions the signal to generate an EFM signal therefrom on path 148. The bit detector 146 also provides control signals to an actuator assembly 150, the latter of which continuously makes fine position and focus adjustments to maintain the light beam in a desired relation to the track being followed.

A decoder 152 demodulates the EFM signal and provides main channel data for processing by a main channel processing block 154, and subcode channel data for processing by a subcode display/processing block 156. The main channel processing block 154 performs conventional error correction, error concealment and filtering operations to provide output data (in this case, computer data) on path 158 substantially corresponding to the input data 108 of FIG. 1. The subcode display/processing block 156 processes the subcode data and provides servo control signals to the actuator assembly 150 in response to the subcode data as well as from inputs from a host interface block 160. The servo control signals direct the actuator assembly 150 to move the readback head assembly 144 to desired track locations on the disc 142.

The EFM signal from path 148 is further provided to a timing block 162 which includes a phase locked loop (PLL) or similar synchronization clock circuitry. The timing block 162 detects the data rate (frequency) of the EFM signal and provides timing signals to the decoder 152, main channel processing block 154 and subcode display/processing block 156 to clock the processing of the main channel and subcode data.

The timing block 162 further provides timing signals to a motor velocity control block 164 to control the linear velocity of a motor 166 to maintain the rate at which the data pass the readback head assembly 144 at a desired data rate. A control block 168 provides top level control for the system 140. For reference, at least the bit detector 146, timing block 162 and motor velocity control block 164 will also be collectively referred to herein as "readback recovery circuitry."

During normal track following operation, the rotational velocity of the disc 142 is controlled to nominally maintain the rate at which data are retrieved therefrom within a desired range bounding an optimum frequency value. When a seek operation is performed to move the readback head assembly 144 to a new track location, the actuator assembly 150 quickly advances the readback assembly 144 to the destination track. The rotational velocity of the motor is adjusted to bring the retrieved data rate of the destination track into the desired range as the readback system 140 attempts to lock onto the data at the new location on the disc.

With reference again to FIG. 2, it will be noted that the readback system 140 of FIG. 3 will generally be able to successfully transduce the data from track 136. However, as the readback head assembly 142 continues reading the disc, the assembly will encounter the step function increase in data rate associated with the higher frequency data of track 138. The resulting EFM signal will undergo a corresponding frequency increase which may cause the timing block 162 to lose frequency lock or to lock onto a harmonic of the frequency. Thus, the data rate variation of track 138 will tend to prevent the readback system 140 from continuous reading of the disc 142 from lead-in to lead-out.

Figure 4:
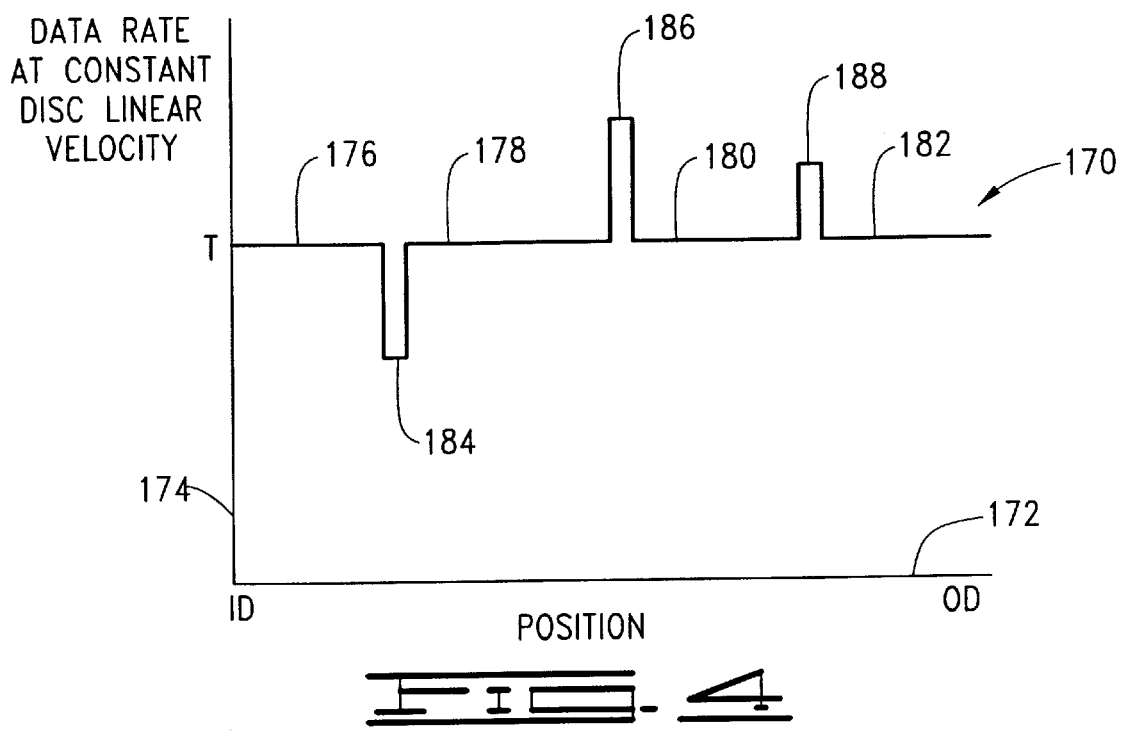
FIG. 4 is a graphical representation of a data rate profile at a disc constant linear velocity (CLV) indicative of the data rate (frequency) at which data are written to an optical disc by the system of FIG. 1 in accordance with a preferred embodiment.

FIG. 4 provides a graphical representation of a data rate profile 170 indicative of the frequency at which data are written to the optical disc 102 by the system 100 of FIG. 1 in accordance with a preferred embodiment. The profile 170 is plotted against an x-axis 172 indicative of disc position (from ID to OD) and a y-axis 174 indicative of frequency (for a constant linear velocity of the disc).

From FIG. 4 it will be observed that data are written at a nominal data rate in noncontiguous data areas 176, 178, 180 and 182 (also referred to herein as "data placement zones"). The data in these areas have symbol lengths that nominally correspond to the lengths for track 136 of FIG. 2 and therefore represent conventional constant linear velocity (CLV) recording. However, velocity disruption zones are provided at 184, 186 and 188 having data written at abruptly different data rates. For example, the data in zone 184 are written at a reduced rate as compared to the nominal rate so that, at a given constant linear velocity of the disc 102, the pits and lands will have longer physical lengths than the corresponding nominal lengths of track 136. Contrawise, the data in zones 186 and 188 are written at higher data rates, and will therefore have shorter pits and lands as compared to the nominal symbol lengths at a constant linear velocity. Of course, the velocity disruption zones 184, 186 and 188 are exemplary in nature and other numbers and magnitudes of zones can readily be employed as desired.

Figure 5:
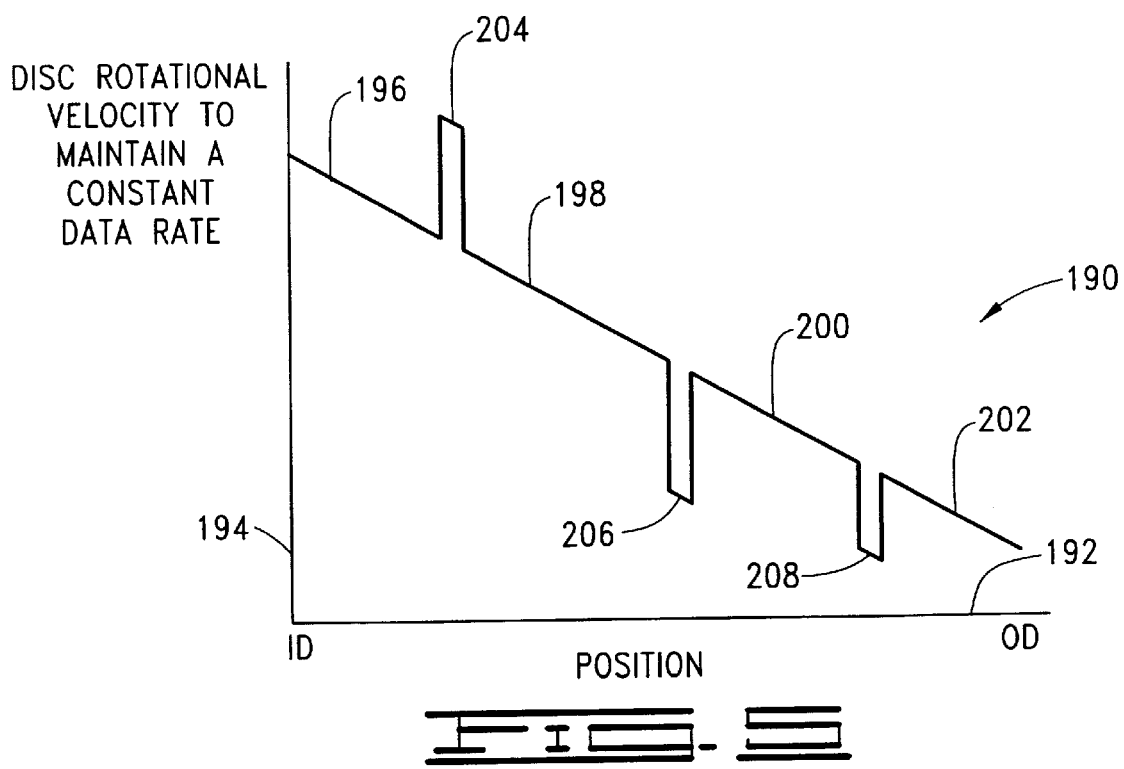
FIG. 5 is a graphical representation of the disc rotational velocity profile required to recover the data written in accordance with the profile of FIG. 4.

FIG. 5 is a graphical representation of a disc rotational velocity profile 190 indicative of the rotational velocity generally required to recover the data written in accordance with the profile of FIG. 4. The velocity profile 190 is plotted against an x-axis 192 indicative of disc position and a y-axis 194 indicative of velocity magnitude. Colinear areas 196, 198, 200 and 202 correspond to the CLV data placement zones 178, 178, 180 and 182 of FIG. 4 and collectively indicate the general reduction in rotational speed (from ID to OD) to maintain constant linear velocity of the disc 142. Discontinuous areas 204, 206 and 208 likewise correspond to the velocity disruption zones 184, 186 and 188 of FIG. 4.

In a preferred embodiment, the data in the disruption zones 184, 186 and 188 of FIG. 4 are "decoy" data which serve no purpose for the user of the disc (but otherwise appear to be valid data). Alternatively, depending on the detection range capabilities of the readback system 140, the data in zones 184, 186 and 188 are valid data which the readback system accesses separately from the adjacent data in areas 176, 178, 180 and 182.

For example, when a command is made to access the data in one of the zones 184, 186 or 188, the control circuit 168 can be configured to override the timing signals provided by the timing block 162, and instead provide the necessary inputs to the motor velocity control block 164 to adjust the rotational velocity of the disc 142 to the appropriate velocity (i.e., that shown by respective areas 204, 206 or 208) to provide a resulting data rate within the capabilities of the rest of the readback system 140. Thus, the entire disc surface can be read in a noncontiguous fashion, but not continuously.

Figure 6:
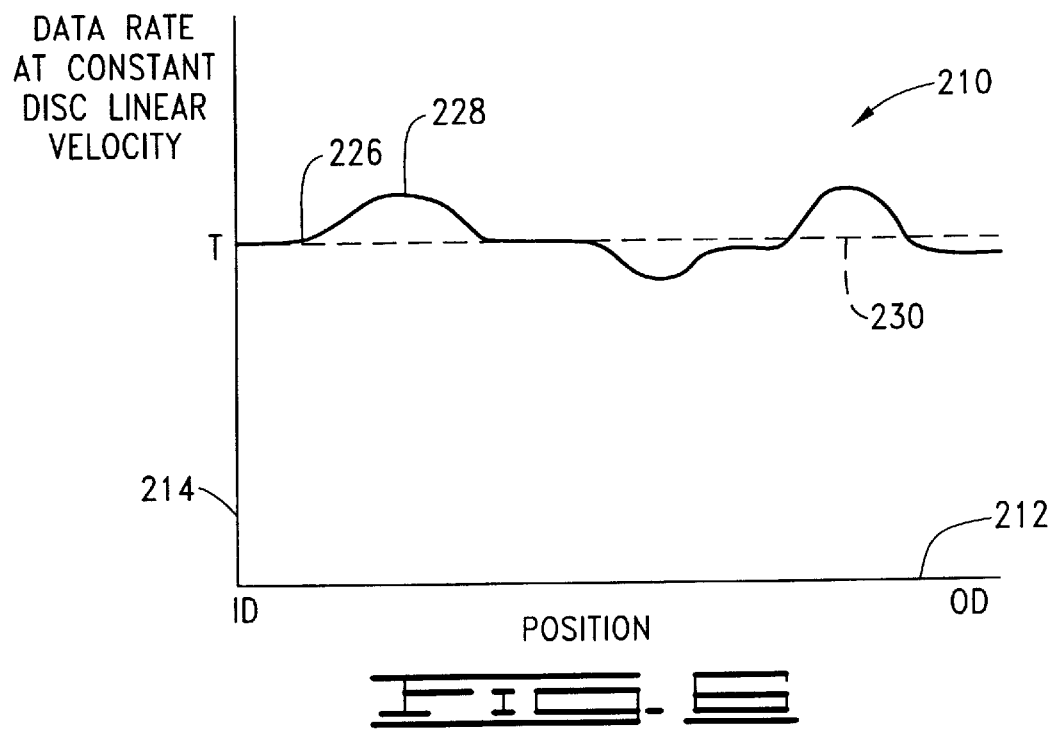
FIG. 6 is a graphical representation of another data rate profile at a disc CLV indicative of the data rate (frequency) at which data are written to an optical disc by the system of FIG. 1 in accordance with another preferred embodiment.
Figure 7:
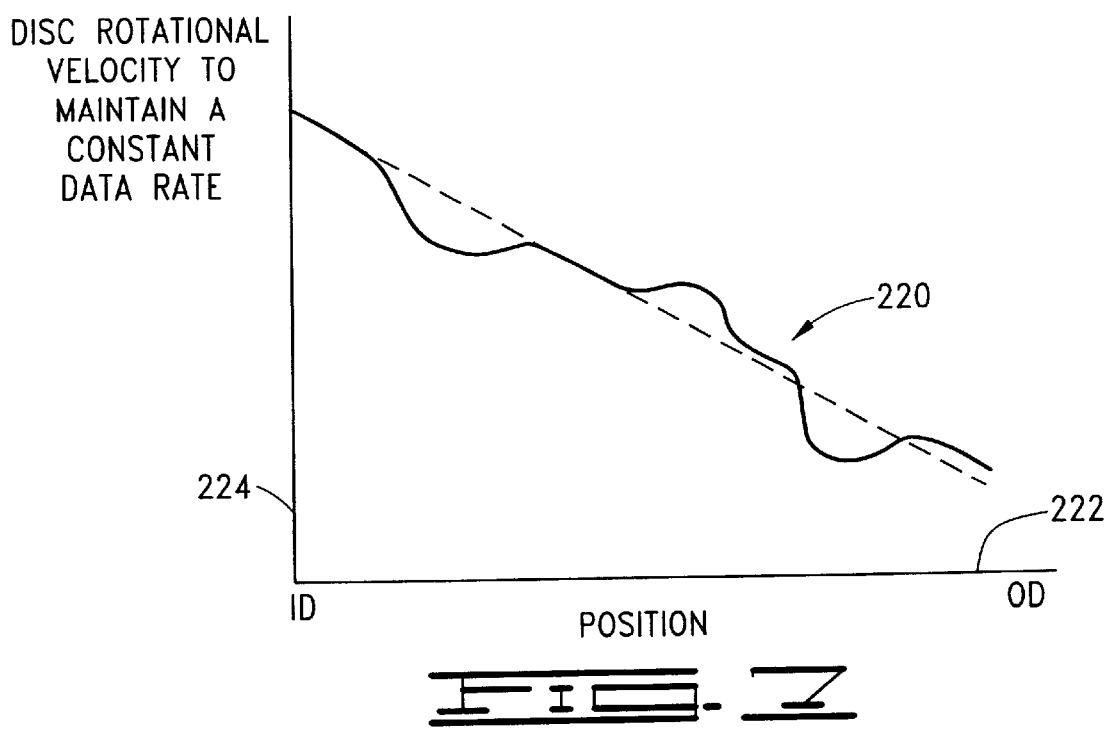
FIG. 7 is a graphical representation of the disc rotational velocity profile required to recover the data written in accordance with the profile of FIG. 8.

FIG. 6 is a graphical representation of another data rate profile 210 at a disc CLV indicative of the data rate (frequency) at which data are written to the optical disc 102 by the system of FIG. 1 in accordance with another preferred embodiment. As with the profile 170 of FIG. 4, the profile 210 is plotted against a position x-axis 212 and a data rate (at CLV) y-axis 214. Unlike the profile 170 of FIG. 4, however, the profile 210 varies from a nominal data rate over substantial portions of the disc 102. FIG. 7 is a graphical representation of a disc rotational velocity profile 220 required to recover the data written in accordance with the profile of FIG. 6, and is plotted against a position x-axis 222 and a rotational velocity y-axis 224. As before, the profile 210 of FIG. 6 is merely exemplary in nature and other profiles having different data rate variation characteristics can readily be employed as desired.

The variations in data rate shown by the profile 210 of FIG. 6 can be provided in such a manner as to disrupt the continuous reading of the disc, as discussed above. For example, the transition from a data placement zone 226 to a velocity disruption zone 228 can be selected to be sufficiently abrupt so that the readback system 140 cannot maintain frequency lock on the data as the readback head assembly 142 advances from zone 226 to zone 228.

In another preferred embodiment, information relating to the data rate profile can be stored on the disc 142 and used for disc authentication purposes. For example, it will be noted that the data rate changes of the profile 210 represent the actual data rate as the disc 142 is read at a constant linear velocity. A readback system (such as the system 140 of FIG. 3) will attempt to speed up and slow down the rotation of the disc 142 to maintain a substantially constant recovered data rate. Using the methodology discussed above to create an unauthorized duplicate disc by reading the disc 142 and transmitting the EFM signal (path 148, FIG. 3) to the LBR 106 (path 116, FIG. 1), the data rate variation of the profile 210 will not appear on the unauthorized duplicated disc. Rather, all of the data on the duplicate disc will have substantially the same size pits and lands across the surface thereof and be written at a substantially constant data rate (as indicated by horizontal broken line 230 in FIG. 6).

During subsequent access of the unauthorized duplicated disc, the readback system 140 can be configured to retrieve the rotational velocity data from the profile 220. Thereafter, as selected portions of the disc 142 are read, the actual velocity of the disc at such portions can be compared to the required velocity from the profile 220. If a mismatch occurs, the control block 168 can prevent further access to the disc. An advantage of this approach is that even though the unauthorized duplicate disc is an exact bit-for-bit copy of the original (without the data rate variations), the unauthorized duplicate disc still cannot be subsequently accessed.

Figure 8:
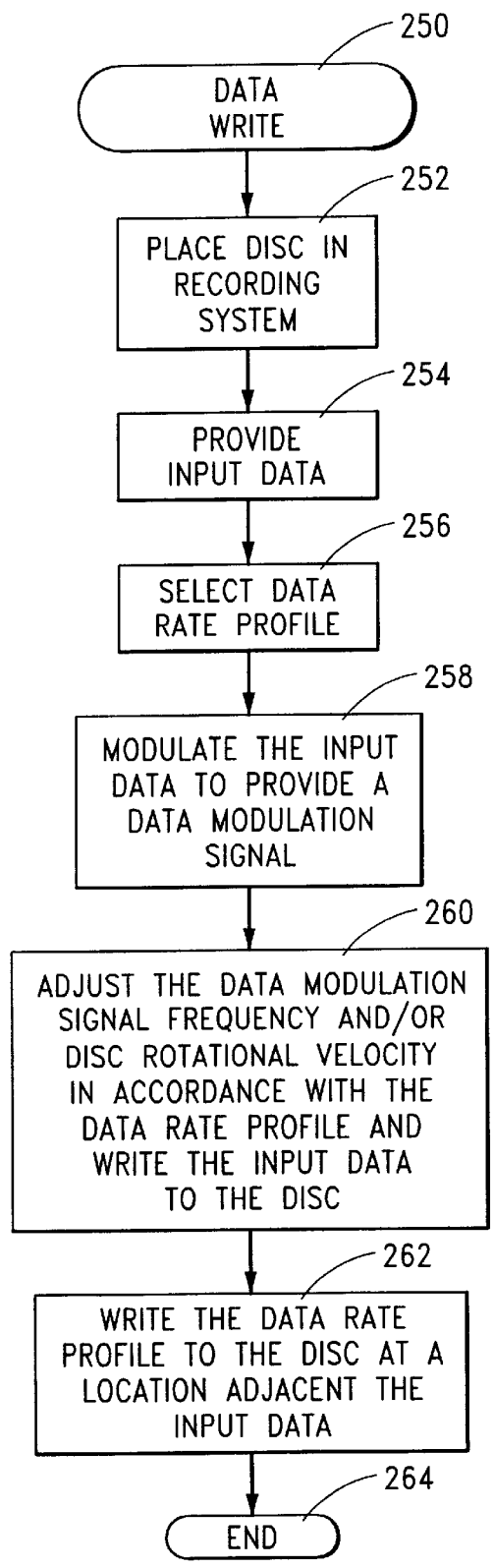
FIG. 8 is a flow chart for a DATA WRITE routine, illustrative of steps carried out in accordance with preferred embodiments of the present invention to write data to an optical disc.

FIG. 8 provides a flow chart for a DATA WRITE routine 250, illustrative of steps carried out in accordance with preferred embodiments of the present invention to use an optical disc recording system to write data to an optical disc. For purposes of the following discussion, it will be contemplated that the routine is carried out by the mastering system 100 of FIG. 1 to write data to the master disc 102.

At step 252, the disc 102 is placed within the recording system. The input data 108 to be recorded to the disc 102 are provided at step 254. An appropriate data rate profile is next selected at step 256 to define the rate at which the data are to appear on the disc at various locations on the disc. Exemplary data rate profiles are shown in FIGS. 4 and 6, although the particular data rate profile will be selected in accordance with the particulars of a given application.

At step 258, the system proceeds to modulate the input data to provide a data modulation signal, such as the EFM signal from encoder 114. The generation and modulation of subcode data are also carried out during this step, as desired. The data are then written to the disc at step 260 in accordance with the data rate profile selected at step 256. This is carried out by adjusting the frequency of the data modulation signal and/or the rotational velocity of the disc as the data are written. In this way, the resulting data rate will vary with disc radius from that which would otherwise normally be obtained using constant linear velocity recording.

Preferably, the variations in data rate at least at selected locations will be sufficient to prevent a readback system from continuously reading the disc from lead-in to lead-out. Additionally, in a preferred embodiment the routine of FIG. 8 continues to step 262 wherein at least a portion of the data rate profile is further stored on the optical disc 102 at a location adjacent to the remaining data on the disc, such as a guardband portion or an unused user data block. This profile information is preferably written so as to not otherwise interfere with the remaining data stored on the disc and may be "hidden" or "disguised" as desired. The routine thereafter ends at step 264.

The manner in which the profile information of step 262 is subsequently used to authenticate a disc is set forth by a DATA ACCESS routine 270 of FIG. 9. For purposes of the present discussion, it will be contemplated that the routine of FIG. 9 is carried out by a readback system such as the system 140 in FIG. 3, although the present invention is not so limited.

The optical disc 142 is placed in the readback system 140 at step 272, and the readback system proceeds to retrieve the data rate profile information therefrom at step 274. In one embodiment, the readback system 140 is configured to automatically retrieve the data rate profile information from one or more predetermined locations on the disc; in another embodiment, the readback system is instructed to retrieve the data by an application software program of the host device in which the readback system 140 is resident.

At step 276, the readback system 140 proceeds to move the readback assembly 144 to one or more selected locations on the disc 142, and read the data from these locations while characterizing the associated data rate. Such characterization will depend on the format of the data rate profile information stored in step 262 of FIG. 8, but may comprise measurement of linear or rotational velocity of the disc for a given data rate, or measurement of a data readback frequency for a given disc velocity.

The actual data rate characteristics are then compared to the expected characteristics at step 278, and the presence or absence of a mismatch is determined by decision step 280. A mismatch can be determined by, for example, determining whether the actual linear velocity is within a selected threshold T of the target linear velocity from the data profile information. If a mismatch is detected, the disc is determined to be an unauthorized duplicate copy and further disc access is denied, as shown by step 282. If no mismatch is detected, the routine passes to step 284 and full disc access is granted. The routine then ends at step 286.

A particularly useful approach is to characterize the data rate profile in terms of disc velocity. It is then be relatively straightforward to move the readback assembly 144 to the appropriate velocity disruption zone, lock onto the data, measure the disc velocity, and confirm that the measured velocity is within the selected range about the target velocity. Thus, even if a third party is able to create an unauthorized duplicate disc copy that matches the original disc bit-for-bit, the foregoing disc authentication scheme will still prevent disc access in the readback system because the duplicate disc will not include the data rate variations of the original. In a related embodiment, the data rate variations can be used to embed hidden data on the disc for forensic tracking purposes. For example, the particular variations can be encoded to correspond to a set of decodable information, or the variation profile can be compared to an external table to indicate the forensic information.

While the foregoing embodiments have been described with respect to pit and land length modulation, it will be understood that other types of modulation, such as depth, width and wobble groove modulation can also be readily employed. Also, discrete concentric tracks can be readily used in lieu of tracks formed from a continuous spiral.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An optical disc to which data are recorded in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the disc comprising:

a data placement zone to which first data are written to produce a first data rate as a frequency at which the first data pass the readback head assembly as the disc is rotated at a selected linear velocity; and a velocity disruption zone adjacent the data placement zone to which second data are written to produce a second data rate as a frequency at which the second data pass the readback head assembly as the disc is rotated at the selected linear velocity, wherein variation in frequency between the first and second data rates is selected to cause the recovery circuitry, having obtained frequency lock on the first data as the first data are retrieved, to subsequently lose frequency lock on the second data as the readback system attempts to sequentially read the first and second data during a continuous access operation.

2. The optical disc of claim 1, wherein the second data are separately accessed from the first data while the disc is rotated at a second disc linear velocity different from the selected disc linear velocity.

3. The optical disc of claim 1, wherein the first and second data are both used by a user of the optical disc and are accessed during separate access operations.

4. The optical disc of claim 1, further comprising a data rate profile zone to which data rate profile information is stored in relation to the variation in frequency between the first and second data rates.

5. The optical disc of claim 4, wherein the data rate profile information includes information indicative of a target linear velocity of the disc sufficient to enable the recovery circuitry to obtain frequency lock on the second data, the data rate profile information facilitating disc authentication by the readback system through steps of measuring the disc linear velocity as the second data are accessed and comparing the measured disc linear velocity with the target linear velocity, and denying further disc access when a mismatch is detected between the measured and target disc linear velocities.

6. An optical disc to which data are recorded in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the disc comprising:

a data placement zone to which first data are written to produce a first data rate as a frequency at which the first data pass the readback head assembly as the disc is rotated at a selected linear velocity;

a velocity disruption zone adjacent the data placement zone to which second data are written to produce a second data rate as a frequency at which the second data pass the readback head assembly as the head is rotated at the selected linear velocity, wherein the second data rate is different from the first data rate; and a data rate profile zone to which information is stored in relation to variation between the first and second data rates to facilitate authentication of the disc by the readback system.

7. The optical disc of claim 6, wherein the data rate profile zone includes a target linear velocity of the disc sufficient to enable the recovery circuitry to obtain frequency lock on the second data, wherein the data rate profile zone facilitates operation of the readback system to authenticate the disc by measuring the disc linear velocity as the second data are accessed, comparing the measured disc linear velocity with the target linear velocity, and denying further disc access when a mismatch is detected between the measured and target disc linear velocities.

8. The optical disc of claim 6, wherein forensic tracking information is stored on the disc in relation to the first and second data rates.

9. A method for writing data to an optical disc in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the method comprising steps of:

(a) providing input data to be written to the disc;

(b) modulating the input data to provide a data modulation signal at a nominal frequency;

(c) selecting a data rate profile in relation to desired variation in frequencies at which different portions of the input data are to appear on the disc; and (d) using the data modulation signal to write the input data to the disc while varying at least a selected one of the nominal frequency of the data modulation signal and a linear velocity of the disc in relation to the selected data rate profile to prevent unauthorized duplication of the disc.

10. The method of claim 9, wherein the input data comprise a first portion of data and a second portion of data, and wherein step (d) comprises steps of:

(d1) writing the first portion of data to a data placement zone to produce a first data rate as a frequency at which the first data pass the readback head assembly as the disc is rotated at a selected disc linear velocity; and (d2) writing the second portion of data to a velocity disruption zone adjacent the data placement zone to which second data are written to produce a second data rate as a frequency at which the second data pass the readback head assembly as the head is rotated at the selected linear velocity, wherein the second data rate is different from the first data rate.

11. The method of claim 9, wherein the variation in frequencies between the first and second data rates is selected to cause the recovery circuitry, having obtained frequency lock on the first data as the first data are retrieved, to subsequently lose said frequency lock on the second data as the readback system attempts to sequentially read the first and second data during a continuous access operation.

12. The method of claim 9, further comprising a step of:

(e) writing information in relation to the selected data rate profile to a data rate profile zone on the disc, said information including a target linear velocity of the disc sufficient to enable the recovery circuitry to obtain frequency lock on the second portion of data stored in the velocity disruption zone.

13. The method of claim 12, in combination with a method for subsequently accessing the data written to the disc comprising steps of:

(f) placing the disc in the readback system;

(g) retrieving the information from the data rate profile zone;

(h) moving the readback head assembly to a location adjacent the velocity disruption zone;

(i) adjusting the disc linear velocity to a final linear velocity value sufficient to enable the recovery circuitry to obtain frequency lock on the second portion of data in the velocity disruption zone;

(j) granting access to remaining portions of the disc when the final linear velocity value is within a selected threshold value associated with the target linear velocity; and (k) denying access to remaining portions of the disc when the final linear velocity value is beyond the selected threshold value associated with the target linear velocity.

14. A system for writing data to an optical disc in the form of optically detectable patterns, comprising:

a write assembly adjacent the disc;

a motor configured to rotate the disc at a selected linear velocity;

an encoder which modulates input data to form a data modulation signal at a nominal modulation frequency; and a control circuit, coupled to the motor and the encoder, which variably adjusts at least a selected one of the disc linear velocity and the modulation frequency in accordance with a data rate profile to write the input data to the disc, wherein the data rate profile is selected in relation to desired variation in frequencies at which different portions of the input data are to appear on the disc to authenticate the disc as an authorized copy.

15. The system of claim 14, wherein the variation in frequencies of the data rate profile prevent continuous reading of the disc.

16. The system of claim 14, wherein the input data comprise a first portion of data and a second portion of data, wherein the control circuit operates to direct the writing of the first portion of data to a data placement zone to produce a first data rate as a frequency at which the first data pass the readback head assembly as the disc is rotated at a selected disc linear velocity, wherein the control circuit further operates to direct the writing of the second portion of data to a velocity disruption zone adjacent the data placement zone to which second data are written to produce a second data rate as a frequency at which the second data pass the readback head assembly as the head is rotated at the selected linear velocity, wherein the second data rate is different from the first data rate.

17. The system of claim 14, wherein the variation in frequencies between the first and second data rates is selected to cause a readback system, having obtained frequency lock on the first data as the first data are retrieved, to subsequently lose said frequency lock on the second data as the readback system attempts to sequentially read the first and second data during a continuous access operation.

18. The system of claim 14, wherein the control circuit further operates to write information in relation to the selected data rate profile to a data rate profile zone on the disc, said information including a target linear velocity of the disc sufficient to enable a readback system to obtain frequency lock on the second portion of data stored in the velocity disruption zone.

19. The system of claim 18, wherein the data rate profile zone facilitates detection of an unauthorized duplicate copy of the disc by the readback system by reading the second portion of data, measuring the disc linear velocity, comparing the disc linear velocity to the target linear velocity, and denying further disc access when a mismatch is detected between the measured disc linear velocity and the target linear velocity.

* * * * *

(12) EX PARTE REEXAMINATION CERTIFICATE (6777th)
United States Patent
Carson

(10) Number: US 6,477,124 C1
(45) Certificate Issued: Apr. 21, 2009

(54) VARYING THE RATE AT WHICH DATA APPEAR ON AN OPTICAL DISC ROTATED AT A CONSTANT LINEAR VELOCITY TO PREVENT UNAUTHORIZED DUPLICATION OF THE DISC

(75) Inventor: Douglas M. Carson, Cushing, OK (US)

(73) Assignee: Doug Carson & Associates, Inc., Cushing, OK (US)

Reexamination Request:
No. 90/007,756, Oct. 5, 2005

Reexamination Certificate for:
Patent No.: 6,477,124
Issued: Nov. 5, 2002
Appl. No.: 09/860,791
Filed: May 18, 2001

Related U.S. Application Data

(60) Provisional application No. 60/249,030, filed on Nov. 15, 2000.

(51) Int. Cl.
*G11B 20/00* (2006.01)

(52) U.S. Cl. ............... 369/53.21; 369/47.45; 369/275.3
(58) Field of Classification Search ................. None
See application file for complete search history.

(56) References Cited

U.S. PATENT DOCUMENTS

| | | | |
|---|---|---|---|
| 5,724,327 A | 3/1998 | Timmermans et al. | |
| 5,737,286 A | 4/1998 | Timmermans et al. | |
| 5,809,006 A | 9/1998 | Davis et al. | |
| 5,812,512 A | * 9/1998 | Tobita et al. | ............ 369/84 |
| 5,930,210 A | 7/1999 | Timmermans et al. | |
| 6,226,244 B1 | 5/2001 | Timmermans et al. | |
| 6,363,041 B1 | 3/2002 | Timmermans et al. | |

* cited by examiner

*Primary Examiner*—Roland G Foster

(57) ABSTRACT

Apparatus and method for recording data to an optical disc to prevent unauthorized duplication of the disc. The disc includes a data placement zone to which first data are written at a first data rate as the disc is rotated at a selected linear velocity. The disc further includes a velocity disruption zone to which second data are written at a second different data rate as the disc is rotated at the selected linear velocity. The variation in frequency between the first and second data rates preferably causes a readback system to lose frequency lock on the second data during a continuous access operation on the first and second data. An unauthorized disc can also be detected by comparing the disc linear velocity as the second data are accessed to a target linear velocity. Access to the disc can be denied when a velocity mismatch is detected.

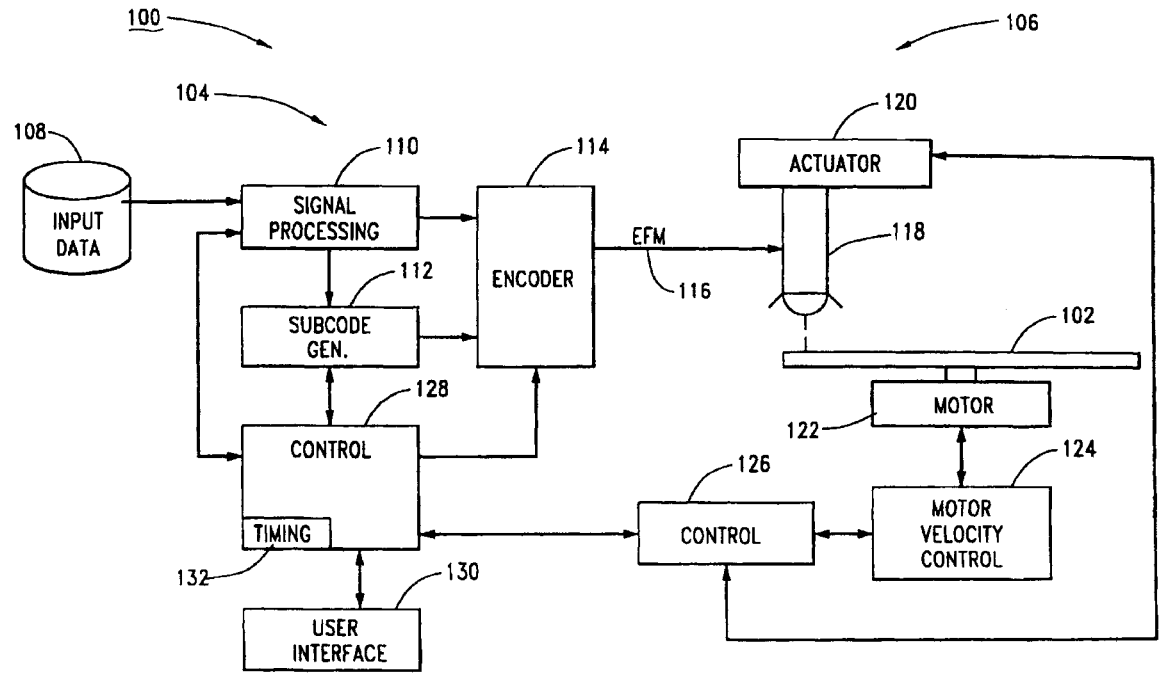

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

Claims 7, 11 and 17 are cancelled.

Claims 6, 9 and 14 are determined to be patentable as amended.

Claims 8, 10, 12, 13, 15, 16, 18 and 19, dependent on an amended claim, are determined to be patentable.

New claims 20–27 are added and determined to be patentable.

6. An optical disc to which data are recorded in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the disc comprising:
   a data placement zone to which first data are written to produce a first data rate as a frequency at which the first data pass the readback head assembly as the disc is rotated at a selected linear velocity;
   a velocity disruption zone adjacent the data placement zone to which second data are written to produce a second data rate as a frequency at which the second data pass the readback head assembly as the head is rotated at the selected linear velocity, wherein the second data rate is different from the first data rate; and
   a data rate profile zone to which information is stored in relation to variation between the first and second data rates to facilitate authentication of the disc by the readback system, *wherein the data rate profile zone includes a target linear velocity of the disc sufficient to enable the recovery circuitry to obtain frequency lock on the second data, wherein the data rate profile zone facilitates operation of the readback system to authenticate the disc by measuring the disc linear velocity as the second data are accessed, comparing the measured disc linear velocity with the target linear velocity, and denying further disc access when a mismatch is detected between the measured and target disc linear velocities.*

9. A method for writing data to an optical disc in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the disc comprising steps of:
   (a) providing input data to be written to the disc;
   (b) modulating the input data to provide a data modulation signal at a nominal frequency;
   (c) selecting a data rate profile in relation to desired variation in frequencies at which different portions of the input data are to appear on the disc; and
   (d) using the data modulation signal to write the input data to the disc while varying at least a selected one of the nominal frequency of the data modulation signal and a linear velocity of the disc in relation to the selected data rate profile to prevent unauthorized duplication of the disc, *wherein the variation in frequencies between the first and second data rates is selected to cause the recovery circuitry, having obtained frequency lock on the first data as the first data are retrieved, to subsequently lose said frequency lock on the second data as the readback system attempts to sequentially read the first and second data during a continuous access operation.*

14. A system for writing data to an optical disc in the form of optically detectable patterns, comprising:
   a write assembly adjacent the disc;
   a motor configured to rotate the disc at a selected linear velocity;
   an encoder which modulates input data to form a data modulation signal at a nominal modulation frequency; and
   a control circuit, coupled to the motor and the encoder, which variably adjusts at least a selected one of the disc linear velocity and the modulation frequency in accordance with a data rate profile to write the input data to the disc, wherein the data rate profile is selected in relation to desired variation in frequencies at which different portions of the input data are to appear on the disc to authenticate the disc as an authorized copy, *wherein the variation in frequencies between the first and second data rates is selected to cause a readback system, having obtained frequency lock on the first data as the first data are retrieved, to subsequently lose said frequency lock on the second data as the readback system attempts to sequentially read the first and second data during a continuous access operation.*

20. *The optical disc of claim 1, wherein the data placement zone is characterized as a first data placement zone, wherein the velocity disruption zone is characterized as a first velocity disruption zone, and wherein the optical disc further comprises a second data velocity zone and a second velocity disruption zone, wherein the first velocity disruption zone is radially disposed between the first and second data placement zones, and wherein the second data placement zone is radially disposed between the first and second velocity disruption zones.*

21. *The optical disc of claim 20, wherein the first and second data placement zones each produce said first data rate as the disc is rotated at the selected linear velocity, and wherein the first and second velocity disruption zones each produce said second data rate as the disc is rotated at the selected linear velocity.*

22. *The optical disc of claim 20, wherein the first and second data placement zones each nominally produce said first data rate as the disc is rotated at the selected linear velocity, and wherein the second velocity disruption zones produces a third data rate as the disc is rotated at the selected linear velocity, the third data rate different from the first and second data rates.*

23. The optical disc of claim 20, wherein the respective locations of the first and second data placement zones and the first and second velocity disruption zones are selected to encode the hidden data on the optical disc, said hidden data corresponding to a set of decodable information.

24. A method for writing data to an optical disc in the form of optically detectable patterns for subsequent access by a disc readback system having a motor configured to rotate the disc at a nominally constant linear velocity, a readback head assembly configured to transduce the optically detectable patterns and readback recovery circuitry configured to obtain frequency lock on a frequency of the optically detectable patterns, the method comprising steps of:

(a) providing input data to be written to the disc;

(b) modulating the input data to provide a data modulation signal at a nominal frequency;

(c) selecting a data rate profile in relation to desired variation in frequencies at which different portions of the input data are to appear on the disc; and (d) using the data modulation signal to write the input data to the disc while varying at least a selected one of the nominal frequency of the data modulation signal and a linear velocity of the disc in relation to the selected data rate profile to prevent unauthorized duplication of the disc, wherein said desired variation in frequencies of the data rate profile are further selected to subsequently cause the recovery circuitry, having obtained frequency lock on a first portion of the input data, to subsequently lose frequency lock on a second portion of the input data as the readback system attempts to sequentially read the first and second portions from the disc.

25. The method of claim 24, wherein the using step further comprises writing a data rate profile zone to the disc which stores information relating to the data rate profile of the selecting step.

26. A system for writing data to an optical disc in the form of optically detectable patterns, comprising:

a write assembly adjacent the disc;

a motor configured to rotate the disc at a selected linear velocity;

an encoder which modulates input data to form a data modulation signal at a nominal modulation frequency; and a control circuit, coupled to the motor and the encoder, which variably adjusts at least a selected one of the disc linear velocity and the modulation frequency in accordance with a data rate profile to write the input data to the disc, wherein the data rate profile is selected in relation to desired variation in frequencies at which different portions of the input data are to appear on the disc to authenticate the disc as an authorized copy, and wherein said desired variation in frequencies of the data rate profile are further selected to subsequently cause recovery circuitry, having obtained frequency lock on a first portion of the input data, to subsequently lose frequency lock on a second portion of the input data as the readback system attempts to sequentially read the first and second portions from the disc.

27. The system of claim 26, wherein the control circuit further writes a data rate profile zone to the disc which stores information relating to the data rate profile.

* * * * *